United States Patent [19]

Prindle

[11] 4,410,681

[45] Oct. 18, 1983

[54] EPOXY RESINS CURED WITH SALICYLOYL HYDROCARBYLAMINES

[75] Inventor: Hershel B. Prindle, Lake Jackson, Tex.

[73] Assignee: The Dow Chemical Company, Midland, Mich.

[21] Appl. No.: 360,711

[22] Filed: Mar. 22, 1982

[51] Int. Cl.$^3$ .................... C08G 59/44; C08G 59/62
[52] U.S. Cl. .................................. 528/98; 525/510; 528/99; 528/100
[58] Field of Search ............... 528/98, 99, 100; 525/510

[56] References Cited

U.S. PATENT DOCUMENTS

| | | | |
|---|---|---|---|
| 2,955,101 | 10/1960 | Bruin et al. | 528/113 X |
| 4,129,556 | 12/1978 | Zondler et al. | 528/97 |
| 4,177,174 | 12/1979 | Hayashi et al. | 528/100 X |
| 4,229,563 | 10/1980 | Foscante et al. | 528/99 |

OTHER PUBLICATIONS

Chemical Abstracts 94:158467h, vol. 94, 1981, p. 90.
Chemical Abstracts 90:170287z, vol. 90, 1979, p. 96.
Chemical Abstracts 86:122373v, vol. 86, 1977, p. 44.
Chemical Abstracts 84:18405n, vol. 84, 1976, p. 62.
Chemical Abstracts 83:149157c, vol. 83, 1975, p. 112.
Chemical Abstracts 77:20716f, vol. 77, 1972, p. 54.
Chemical Abstracts 75:152611m, vol. 75, 1971, p. 37.
Chemical Abstracts 71:79818r, vol. 72, 1970, p. 28.

*Primary Examiner*—Earl A. Nielsen
*Attorney, Agent, or Firm*—J. G. Carter

[57] ABSTRACT

Epoxy resins are cured with salicyloyl hydrocarbyl amines such as N,N'-disalicyloyl-1,2-propylenediamine. The cured resins have an improvement in one or more properties such as color, tensile strength and flexural strength or improved pot life when compared to amine curing agents such as methylene dianiline.

12 Claims, No Drawings

EPOXY RESINS CURED WITH SALICYLOYL HYDROCARBYLAMINES

BACKGROUND OF THE INVENTION

The present invention concerns suitable compositions containing epoxy resins and salicyloyl hydrocarbylamines and cured compositions thereof.

Epoxy resins have typically been cured with amines such as methylene dianiline to produce cured products with excellent properties.

The present invention concerns salicyloyl hydrocarbyamines as new curing agents for epoxy resins which provide cured products having excellent properties and, in some instances, have an improvement in one or more properties such as tensile strength, impact strength, color and the like.

SUMMARY OF THE INVENTION

The present invention is directed to a curable composition comprising (A) an epoxy resin having an average of more than one 1,2-epoxy group per molecule and (B) a curing quantity of at least one curing agent represented by the formulas

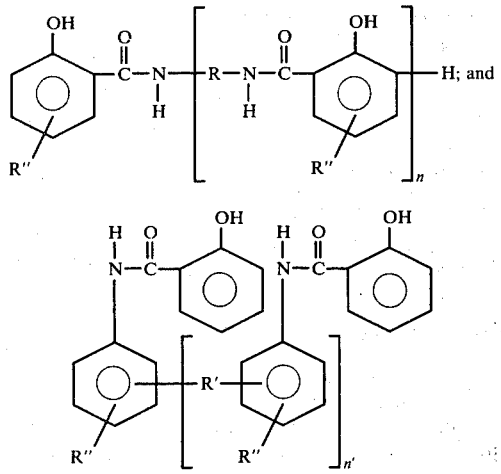

wherein R is a divalent hydrocarbyl group having from 1 to about 10, preferably from about 2 to about 6, carbon atoms; R' is a divalent hydrocarbyl group having from 1 to about 6 carbon atoms; R'' is hydrogen or a hydrocarbyl group having from 1 to about 10 carbon atoms; n has a value of zero or 1 and n' has an average value of from about 1.01 to about 5, preferably from about 1.1 to about 2.5.

The present invention also pertains to the product resulting from the aforesaid curable compositions.

DETAILED DESCRIPTION OF THE INVENTION

Suitable epoxy resins which can be employed herein include the glycidyl ethers of aromatic or aliphatic compounds having an average of more than one hydroxyl group per molecule. Also suitable are the epoxy resins resulting from epoxidizing compounds having an average of more than one ethylenically unsaturated group per molecule by means of a peroxygenated acid such as peracetic acid. These and other suitable epoxy resins which can be employed herein are disclosed n *EPOXY RESIN HANDBOOK,* by Lee and Neville, McGraw-Hill, 1967, which is incorporated herein by reference.

Suitable salicyloyl hydrocarbylamines which can be employed herein include salicylamide and the product resulting from reacting a hydrocarbyl salicylate with a compound having an average of more than one -$NH_2$ group per molecule and removing therefrom the resultant byproduct which is the hydroxyl derivative of the hydrocarbyl constituent of the hydrocarbylsalicylate. Particularly suitable hydrocarbyl salicylates from which the curing agents employed in the present invention can be prepared include methylsalicylate and phenylsalicylate wherein the byproduct would be methanol and phenol respectively.

Suitable amines which can be employed to prepare the curing agents employed in the present invention include, for example, ethylenediamine, propylenediamine, hexamethylenediamine, methylene-dianiline, 2,4-toluenediamine, 2,6-tolenediamine, polymethylene polyphenylamine, 1,2-phenylenediamine, 1,3-phenylenediamine, 1,4-phenylenediamine, mixtures thereof and the like.

The quantity of the salicyloyl hydrocarbylamine curing agents employed in the present invention varies with the particular utility, degree of cure, the particular curing agent itself, but they are usually employed in an amount which provides from about 0.1 mole to about 1 mole, preferably from about 0.15 mole to about 0.5 mole, of curing agent per epoxy equivalent contained in the epoxy resin.

The curable compositions of the present invention may also contain, if desired, pigments, dyes, fillers, diluents, flow control agents, fire retardant agents, accelerators, other curing agents and the like.

The following examples are illustrative of the invention, but are not to be construed as to limiting the scope thereof in any manner.

The salicyloyl hydrocarbylamine curing agents are prepared by the following general procedure.

A mixture of two moles of phenyl salicylate and one mole of the appropriate amine is heated at 150°–160° C. with stirring under nitrogen for 4–12 hours. The phenol liberated is removed either via washing with toluene or vacuum distillation. The residue is purified by recrystallization. Aliphatic amines generally require 4–5 hours of heating while the sterically hindered 2,6-diaminotoluene requires 12 hours. The overall yields are 75–90% after purification. Aliphatic amines can be used as received but aromatic amines should be purified by vacuum distillation from zinc dust.

EXAMPLE 1

Use of N,N'-disalicyloyl-1,2-propylenediamine

Into separate beakers was weighed 64.9 g (0.21 mole) N,N'-disalicyloyl-1,2-propylenediamine and 155.1 g (0.83 equiv.) of a diglycidyl ether of bisphenol A (DGEBA) having an average epoxide equivalent weight (EEW) of about 188. These were placed in an oven at 110°–120° C. and heated until the former was melted. The contents of the two beakers were combined, mixed and poured into cavity molds heated to 100° C. The system was cured by holding the molds at 100° C. for 1 hour (3600 s), then raising the temperature to 150° C. for an additional 2 hours (7200 s). The molds were then cooled, the specimens removed and evaluated by various tests, the results being given in Table I.

EXAMPLE 2

Use of N,N'-disalicyloyl-1,2-ethylenediamine 64.8 g (0.22 mole) of N,N'-disalicyloyl-1,2-ethylenediamine were added to 200 g (1.06 equiv.) of DGEBA having an average EEW of about 188 epoxy resin in a beaker on a hot plate at ambient temperature. The mixture was heated to 150° C. with stirring. The amide dissolved at about 125° C. The homogeneous solution was poured into a heated cavity at 150° C. and cured 2 hours (7200 s) at 150° C. followed by 2 hours (7200 s) at 175° C. The molds were cooled and the specimens evaluated. The results are given in Table I.

EXAMPLE 3

Use of N,N'-disalicyloyl-1,6-hexamethylenediamine 58 g (0.16 mole) of N,N'-disalicyloyl-1,6-hexamethylenediamine were added to beakers containing 200 g (1.06 equiv.) of DGEBA having an average EEW of about 188 epoxy resin. The mixture was heated to 150° C. while stirring. The amide dissolved in the epoxy resin at about 125° C. When the solution was thoroughly mixed and free of bubbles, it was poured into cavity molds heated to 150° C. The system was cured for 2 hours (7200 s) at 150° C. and 2 hours (7200 s) at 175° C. The molds were cooled, the specimens removed and evaluated. The results are given in Table I.

EXAMPLE 4

Use of N,N'-disalicyloyl-2,4-toluenediamine 51.3 g (0.14 mole) of N,N'-disalicyloyl-2,4-toluenediamine and 88.4 g (0.47 equiv.) of DGEBA having an average EEW of about 188 were weighed into separate beakers and placed on a hot plate and heated until the amide melted (ca 160° C.). The contents of the two beakers were then combined, rapidly mixed, and poured into cavity molds heated to 150° C. The system was cured for 1 hour (3600 s) at 150° C. and 2.7 hours (9720 s) at 170°–180° C. The molds were cooled, the specimens removed and evaluated. The results are given in Table I.

EXAMPLE 5

Use of Salicylamide 1.62 g (0.012 mole) of salicylamide and 6.38 g (0.034 equiv.) of DGEBA having an average EEW of about 188 were placed in a weighing pan and heated on a hot plate with stirring until the salicylamide had dissolved. When the homogeneous mixture was free of air bubbles, it was cured in an oven at 150° C. for 2 hours (7200 s) followed by 4 hours (14400 s) at 175° C. The sample was removed from the oven, cooled, and evaluated. The results are given in Table I.

EXAMPLE 6

Use of salicylamide plus benzyltrimethyl ammonium hydroxide as catalyst

To 15.6 g. (0.11 mole) of salicylamide in a beaker was added 3.3 g of a 35% solution of benzyltrimethyl ammonium hydroxide in methanol. To another beaker was added 64.6 g (0.34 equiv.) of DGEBA having an average EEW of about 188. Both beakers were placed on a hot plate and heated until the salicylamide was melted (ca 150° C.). The contents of the two beakers were combined, rapidly mixed, and poured in a cavity mold heated to 90° C. The system was cured for 1 hour (3600 s) at 95° C., 1 hour (3600 s) at 110° C., and 2 hours (7200 s) at 150° C. The mold was cooled and the specimens removed and evaluated. The results are given in Table I.

TABLE I

| EXAMPLE NUMBER | NOTCHED IMPACT pli[1]/kgplm[2] | HEAT DISTORTION °C. | Tg °C. |
|---|---|---|---|
| 1 | 0.86/15.36 | 123 | 141 |
| 2 | 0.42/7.5 | 103 | 120 |
| 3 | 0.08/1.43 | 81 | 103 |
| 4 | 0.26/4.64 | 119 | 133 |
| 5 | N.D.[3] | N.D.[3] | 57 |
| 6 | N.D.[3] | — | 104 | 112 |

[1] pli = pounds per linear inch
[2] kgplm = kilograms per linear meter
[3] N.D. = not determined

EXAMPLE 7

Separate samples of amide and epoxy were weighed into aluminum dishes. Total weight of the amide and epoxy was 8–10 g. Samples with ratios of 0.15–0.5 mole amide/equiv DGEBA having an average EEW of about 188 were prepared for all the salicylamides. However, in the case of N,N'-disalicyloyl-1,2-propylenediamine this range was extended to include 1 mole amine/1.0 equiv. of DGEBA.

In most cases, each pair of amide and epoxy components were heated to the melting point of the amide, then combined and mixed. Some amides with higher melting points were heated with the epoxy in order to solubilize the amide at a lower temperature. In each case, a homogeneous, non-gelled sample was obtained prior to being placed in the curing oven. The Tg (glass transition temperature) for these are shown in Table II.

TABLE II

Tg's FOR N,N'—DISALICYLOYL ALKYLENEDIAMINES AND SALICYLAMIDE CURED DGEBA COMPOSITIONS

| Diamine Derivative | MOLES AMIDE/EQ. DGEBA EPOXY RESINS | | | | | | | | | | | CURING SCHEDULE | | | |
|---|---|---|---|---|---|---|---|---|---|---|---|---|---|---|---|
| | 0.15 | 0.20 | 0.25 | 0.30 | 0.35 | 0.40 | 0.45 | 0.50 | 0.675 | 0.75 | 1.0 | Hrs. | °C. | Hrs. | °C. |
| 1,2-propylene | 115 | 120 | 138 | 142 | 118 | 117 | 104 | 80 | 76 | 69 | 66 | 1 | 100 | 2 | 150 |
| 1,2-ethylene | 82 | 110 | 118 | 120 | 116 | 114 | 111 | 113 | — | — | — | 2 | 150 | 2 | 175 |
| 1,6-hexylene | 57 | 78 | 83 | 92 | 91 | 103 | 101 | 85 | — | — | — | 2 | 150 | 2 | 175 |
| 2,4-toluene | 91 | 104 | 118 | 133 | 135 | 138 | 137 | 135 | — | — | — | 2 | 150 | 2 | 175 |
| Other: | | | | | | | | | | | | | | | |
| Salcylamide | liq. | gel | 45 | 43 | 57 | 54 | 56 | 77 | — | — | — | 2 | 150 | 2 | 175 |

EXAMPLE 8

Various epoxy resins were cured with N,N'-disalicyloyl-1,2-propylenediamine. The results are given in Table III.

TABLE III

| | A[1] | B[2] | C[3] | D[4] | E[5] | F[6] |
|---|---|---|---|---|---|---|
| C-3, phr | 49.1 | 68.8 | 53.8 | 23.9 | 17.9 | 61.6 |
| grams of Curing Agent | 13.2 | 16.3 | 14.0 | 12.7 | 6.1 | 15.2 |
| grams of Epoxy Resins | 26.8 | 23.7 | 26.0 | 37.3 | 33.9 | 24.8 |
| Mixing temperature, °C. | 100 | 100 | 100 | 100 | 125 | 100 |
| Initial Gel Hrs./Seconds | 3/10800 | 2.5/9000 | 3/10800 | 2.5/9000 | 2/7200 | 1.5/5400 |
| Temp °C. | 100 | 100 | 100 | 100 | 100 | 100 |
| Post Cure #1 Hrs./Seconds | 2/7200 | 1/3600 | 2/7200 | 1/3600 | 1/3600 | 2/7200 |
| Temp °C. | 150 | 150 | 150 | 150 | 150 | 150 |
| Post Cure #2 Hrs./Seconds | — | 2/7200 | — | 2/7200 | 2/7200 | — |
| Temp °C. | — | 175 | — | 175 | 175 | — |
| Tg, °C. | 98 | 144 | 142 | 157 | 69 | 181 |
| H.D., °C. | 55 | 104 | 120 | 143 | 99 | 178 |

Footnotes to Table III
[1] Epoxy Resin A was a mixture of 70% by weight of the DGEBA having an average EEW of about 188 and 30% by weight of the diglycidyl ether of a polyoxypropylene glycol having an average molecular weight of about 250, the epoxy resin having an average EEW of about 201. The average EEW of the mixture was about 190.
[2] Epoxy resin B was a cycloaliphatic epoxy resin having an average EEW of about 137 commercially available from Union Carbide Corporation as ERL 4221.
[3] Epoxy Resin C was a polyglycidyl ether of a phenol-formaldehyde novolac resin having an average epoxide functionality of about 2.2 and an average EEW of about 175.
[4] Epoxy Resin D was a diglycidyl ether of tetra-bromobisphenol A having an average EEW of about 172.
[5] Epoxy Resin E was a solid diglycidyl ether of bisphenol A having an average EEW of about 525.
[6] Epoxy Resin F was a triglydicyl ether of tris(hydroxyphenyl)methane having an average EEW of about 153.

EXAMPLE 9

DGEBA having an average EEW of about 188 was cured with 0.25 mole of N,N'-disalicyloyl-1,2-propylenediamine per epoxy equivalent employing various curing schedules. The results are given in the following Table IV. The results were compared to the epoxy resin cured with 0.50 mole of methylenedianiline (MDA) per epoxy equivalent at the 150° C. post cure.

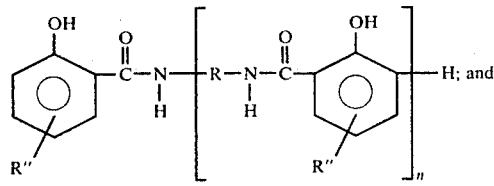

I.

TABLE IV

EFFECT OF CURING SCHEDULE ON THE PHYSICAL PROPERTIES OF A 0.25 MOL. N,N'—DISALICYLOYL-1,2-PROPYLENEDIAMNE/EQ. OF EPOXY

| | All samples initially cured 1 hr at 100° C. followed by 2 hrs at indicated temperature | | | | Typical Values, MDA Cure, |
|---|---|---|---|---|---|
| | 100° C. | 125° C. | 150° C. | 175° C. | 150° C. |
| Barcol Hardness | 14.0 | 13.4 | 15.5 | 13.6 | N.D.[3] |
| Heat Distortion, °C. | 102.5 | 123.9 | 121.7 | 122.5 | 160 |
| Tg (via Tma)[1], °C. | 99.5 | 138.0 | 143 | 134 | 153 |
| Tg (via DSC)[2], °C. | 99 | 130.5 | 139.5 | 122 | N.D. |
| Tensile Strength, psi/MPa | N.D. | 12,762/88 | 12,406/85 | N.D. | 10,200/70 |
| Flexural Strength, psi/MPa | 16,914 | 19,508/134 | 20,453/141 | 20,854/144 | 13,500/93 |
| Flexural Modulus | $5.05 \times 10^5$ | $4.94 \times 10^5$ | $4.83 \times 10^5$ | $4.95 \times 10^5$ | $3.9 \times 10^5$ |

[1] TMA = thermogravimetric analysis
[2] DSC = differential scanning calorimeter
[3] N.D. = not determined

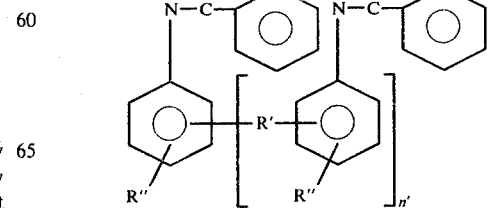

II.

I claim:
1. A curable composition comprising (A) an epoxy resin having an average of more than one 1,2-epoxy groups per molecule and (B) a curing quantity of at least one curing agent represented by the formulas wherein R is a divalent hydrocarbyl group having from 1 to about 10, preferably from about 2 to about 6, carbon atoms; R' is a divalent hydrocarbyl group having from 1 to about 6 carbon atoms; R" is hydrogen or a hydrocarbyl group having from 1 to about 10 carbon atoms; n has a value of 1 and n' has an average value of from about 1.01 to about 5.

2. A curable composition of claim 1 wherein in component (A) said 1,2-epoxy group is a glycidyl ether group and component (B) is one or more compounds wherein R is a divalent hydrocarbon group having from about 2 to about 6 carbon atoms; R' is a methylene group; and n' has an average value of from about 1.2 to about 2.5.

3. A curable composition of claim 2 wherein component A is a polyglycidyl ether of a compound having more than one phenolic hydroxy group per molecule or a brominated derivative thereof.

4. A curable composition of claim 3 wherein component A is a diglycidyl ether of bisphenol A.

5. A curable composition of claim 1, 2, 3 or 4 wherein in formula I R is the residue resulting from the removal of each amine group of ethylene diamine, 1,2-propylene diamine, 1,6-hexamethylenediamine, 1,4-toluenediamine, 1,2-phenylenediamine, 1,3-phenylenediamine or 1,4-phenylenediamine.

6. A curable composition comprising (A) an epoxy resin having an average of more than one 1,2-epoxy groups per molecule and (B) a curing quantity of at least one curing agent represented by the formulas

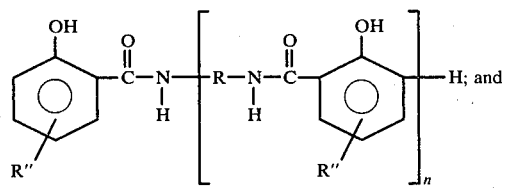

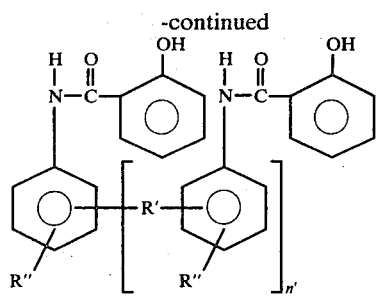

wherein R is a divalent hydrocarbyl group having from 1 to about 10, preferably from about 2 to about 6, carbon atoms; R' is a divalent hydrocarbyl group having from 1 to about 6 carbon atoms; R" is hydrogen or a hydrocarbyl group having from 1 to about 10 carbon atoms; n has a value of zero or 1 and n' has an average value of from about 1.01 to about 5.

7. A curable composition of claim 6 wherein in component (A) said 1,2-epoxy group is a glycidyl ether group and component (B) is one or more compounds wherein R is a divalent hydrocarbon group having from about 2 to about 6 carbon atoms; R' is a methylene group; n has a value of 1 and n' has an average value of from about 1.2 to about 2.5.

8. A curable composition of claim 7 wherein component A is a polyglycidyl ether of a compound having more than one phenolic hydroxyl group per molecule or a brominated derivative thereof.

9. A curable composition of claim 8 wherein component A is a diglycidyl ether of bisphenol A.

10. A curable composition of claim 5, 6, 7, 8 or 9 wherein in formula I R is the residue resulting from the removal of each amine group of ethylene diamine, 1,2-propylene diamine, 1,6-hexamethylenediamine, 1,4-toluenediamine, 1,2-phenylenediamine, 1,3-phenylenediamine or 1,4-phenylenediamine.

11. The product resulting from curing a composition of claim 1, 2, 3, 4, 6, 7, 8 or 9.

12. The product resulting from curing a composition of claim 10.

* * * * *